Jan. 21, 1941. J. E. ROLLO 2,229,523
WHEEL MOUNTING
Filed March 6, 1939
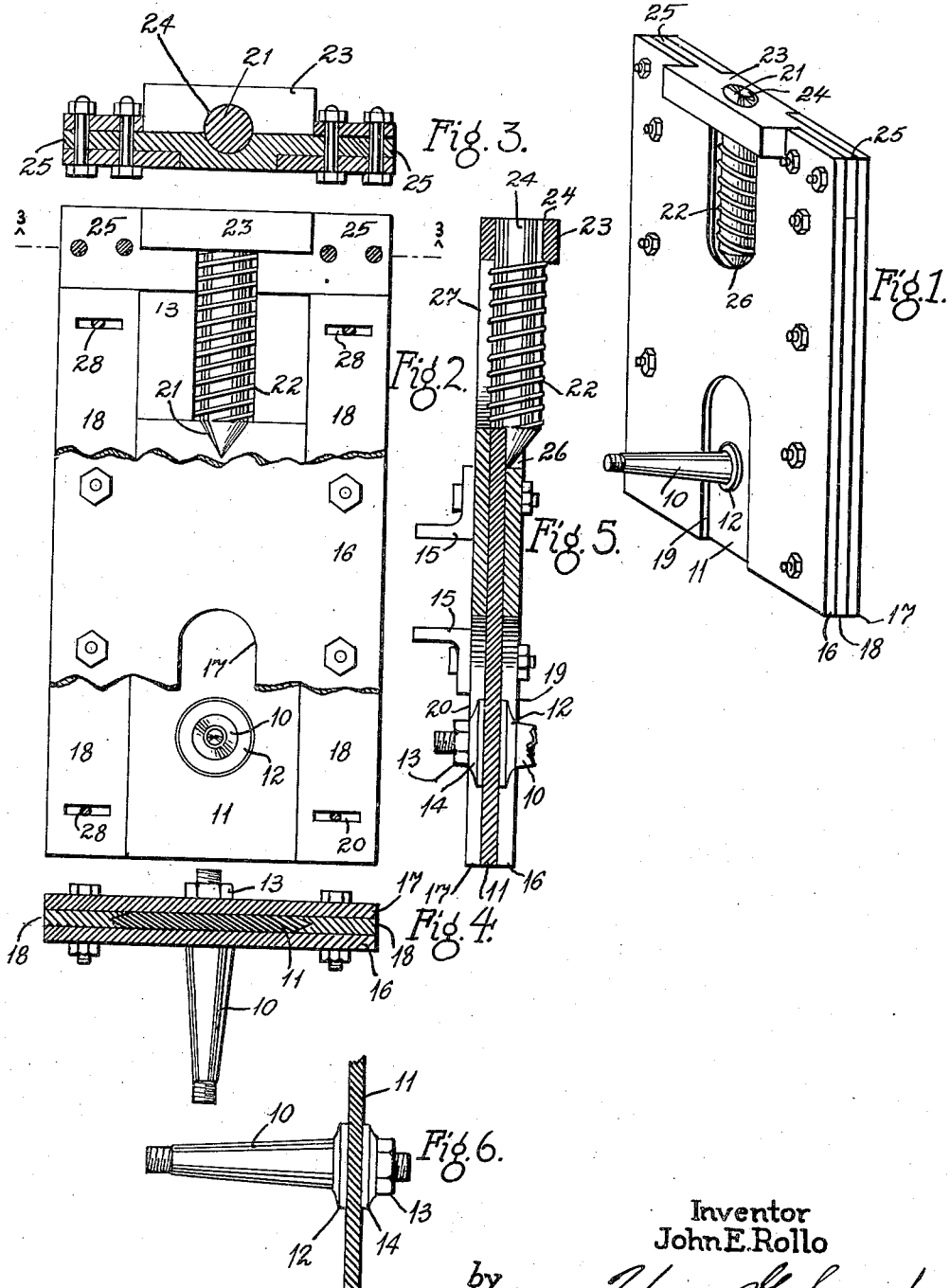
Inventor
John E. Rollo
by Homer G. Sweet
Attorney Patented Jan. 21, 1941

2,229,523

UNITED STATES PATENT OFFICE 2,229,523

WHEEL MOUNTING

John E. Rollo, Denver, Colo.

Application March 6, 1939, Serial No. 260,116

3 Claims. (Cl. 301—133)

This invention relates to mountings for vehicle wheels.

One of the objects of the invention is to provide an improved mounting for vehicle wheels such that the necessity for axles is eliminated.

A further object of the invention is to provide a mounting of said character wherein is incorporated effective shock absorbing means.

A further object of the invention is to provide a mounting of said character such that a plurality of such mountings may be utilized in connection with a vehicle, each thereof associated with a wheel, and each thereof susceptible of independently absorbing shocks from the wheel with which it is associated.

A further object of the invention is to provide a mounting of said character comprising a unitary assembly, including shock absorbing means.

A further object is to provide a mounting of said character adapted for utilization in association with a variety of types of vehicles.

A further object of the invention is to provide a mounting of said character which is readily removable and replaceable.

A further object of the invention is to provide a mounting of said character having transversely adjustable bearing plates intermediate which a slidably mounted leaf is positioned for vertical reciprocation as an element in shock absorbing means.

A further object of the invention is to provide a mounting of said character which is readily accessible for lubrication and inspection.

A further object of the invention is to provide a mounting of said character utilizable in connection with conventional types of vehicle wheels.

A further object of the invention is to provide a mounting of said character which is of simple and rugged construction, of long life, and relatively inexpensive of manufacture.

My invention consists in the construction, arrangement, and combination of elements hereinafter set forth, pointed out in my claims, and illustrated by the accompanying drawing, in which—

Figure 1 is an isometric perspective of my improved wheel mounting. Figure 2 is a front elevation of the showing of Figure 1, portions thereof being broken away to expose otherwise concealed construction. Figure 3 is a cross section taken along the line 3—3 of Figure 2. Figure 4 is a downwardly viewed cross section of the lower part of the mounting. Figure 5 is a vertical cross section of the central portion of the showing of Figure 2. Figure 6 is an elevation of the spindle shown in Figure 4, and a sectional fragment of the leaf to which attached.

In the typical embodiment of my invention shown in the drawing, a spindle 10 is firmly affixed to a leaf 11 perpendicular to the plane thereof, as shown in Figure 6. For the purpose of such affixation said spindle may be provided adjacent its rear extremity with a boss 12 and a shank of smaller diameter extending rearwardly thereof and passing through leaf 11, suitably apertured for such purpose, said shank terminating in a threaded end on which is received and secured a nut 13 bearing against a washer 14 intermediate said nut and the rear wall of leaf 11. The forward portion of said spindle may be of any suitable form for reception in the bearing of a vehicle wheel, to serve as a journal for the rotation of said wheel, and, for association with a wheel of a conventional type, may be of frusto-conical form, tapering toward a point forward from said leaf and terminating in a threaded end for the reception and securing of a nut to maintain said wheel in rotatably mounted position, all in accordance with well known practice.

Said spindle and leaf are embodied in a unitary assembly, such as shown in Figure 1, constituting a wheel mounting utilizable in connection with various types of vehicle and attachable to the frame or body of such vehicle, in accordance with the type and construction thereof, in any suitable manner, and for convenience in effecting such attachment I may provide lugs 15 extending rearwardly of said unitary mounting, as indicated in Figure 5. As many such mountings as desirable may be attached to the vehicle, in accordance with the character and dimensions thereof and the burden to be transported, positioned and spaced apart as may be expedient, and a wheel may be rotatably mounted on the spindle 10 of each such mounting, thereby rendering said vehicle susceptible of surface travel and eliminating the use of axles for the wheels so mounted.

In order to afford the requisite cushioning effect intermediate the body of such a vehicle and the wheels so mounted, leaf 11 is assembled in coacting relation with other elements of said mounting so as to be resiliently yieldable vertically to a degree suitable for the effective absorption of upward thrusts imparted to it through the wheel and spindle 10 occasioned by the unevenness of the surface over which the vehicle may be traveling, which end is attained by the cooperative association of parts in the unitary assembly in a manner which will be disclosed by the detailed description of the construction thereof.

In the assembled mounting, leaf 11 is centrally disposed within a framework comprising a face plate 16, a back plate 17, and two vertical, parallel, spaced apart bearing plates 18, interlying said face plate and said back plate and adjacent the vertical margins thereof, all of said plates being secured in position in the assembly by bolts or other suitable means. Leaf 11 may be disposed intermediate bearing plates 18 and coplanar therewith; the vertical margins of leaf 11, and the adjacent vertical side walls of bearing plates 18, are suitably formed with respective relation to each other for slidable reciprocation of leaf 11 vertically, and as one convenient means of providing suitable slide bearings for such purpose the vertical margins of leaf 11 may be beveled, as clearly shown in Figure 4, and the vertical side walls of bearing plates 18 nearer each other may be longitudinally recessed conformably to said bevels so as to embracingly receive the same. The upper margin of leaf 11 is normally positioned downwardly from the upper extremities of the longitudinal recesses in bearing plates 18, as clearly shown in Figure 2, in order to provide space for the travel of leaf 11 in its vertical reciprocation occasioned by shocks imparted to it from the wheel with which it is associated, as hereinbefore mentioned. In order to provide free space for the vertical travel of spindle 10, the lower portion of face plate 16 is provided with a vertical slot 19 having walls sufficiently spaced apart and away from spindle 10 for free travel of said spindle therebetween, and back plate 17 is provided with a similar slot which is indicated in Figure 5 by the reference numeral 20.

As one of the elements for shock absorbing means associated with leaf 11, I provide a shaft 21, rising upward from the upper margin of leaf 11 and centrally thereof, secured to said leaf or formed integral therewith, and preferably cylindrical in form with its axis parallel to the direction of travel of leaf 11, to serve as a carrier for compression spring 22 coiled thereabout and adapted to yieldably and resiliently receive the impacts of upward thrusts of leaf 11. The lower portion of spring 22 may bear against the upper margin of leaf 11, and the upper portion of said spring may bear against the under surface of the ledge of a cap block 23, provided with an aperture 24 through which shaft 21 may extend and reciprocate. Cap block 23 may be of any suitable construction for secure affixation at the upper portion of the assembled mounting, one construction convenient for the purpose being clearly indicated in Figure 3, wherein cap block 23 comprises a central and forwardly extending ledge and a central and slightly rearwardly extending rib with the aperture 24 in the central portion of said block, and with wing walls 25 of the same thickness as bearing plates 18 and horizontally disposed between face plate 16 and back plate 17. Said face and back plate may be recessed along their upper margins for the accommodation of said ledge and rib, as clearly shown in Figure 3, and bearing plates 18 are of less height than the walls of said face plate and back plate, as clearly shown in Figure 2, thereby providing a space above said bearing plates such that wing walls 25 may interlie said face plate and back plate. By this construction the upper portion of said face plate and back plate and said wing walls may be bolted together or otherwise secured in fixed position, thereby affording rigidity to the framework of the assembled mounting and enabling the framework to withstand the forces transmitted through spring 22 to cap block 23.

In order to afford ample space for shaft 21 and spring 22, and convenient access for lubrication, the upper portion of face plate 16 may be provided with a vertical slot 26, as is clearly shown in Figure 1, and back plate 17 may be provided with a similar slot as indicated at 27 in Figure 5, the walls of each of said slots being sufficiently spaced apart to allow ample clearance for spring 22 in its operative relation with shaft 21.

Bearing plate 18 may be provided with transverse slots 28, adapted to receive bolts extending therethrough and also through face plate 16 and back plate 17 for the securing together of said elements of the frame work, said bearing plates being thus held firmly in the mounting and also being susceptible of adjustment transversely thereof in order to provide accurately positioned bearings for the vertical margins of leaf 11 for the vertical reciprocation there as hereabove mentioned.

Since many changes, variations, and modifications in the specific form, construction, and arrangement of elements shown and described may be had without departing from the spirit of my invention, I wish to be understood as being limited solely by the scope of the appended claims, rather than by any details of the illustrative showing and foregoing description.

I claim as my invention—

1. In a wheel mounting, a guide frame comprising a back plate adapted to be vertically-disposed in fixed relation with a vehicle frame, a face plate spaced from and overlying said back plate, side bearing plates vertically disposed in spaced, parallel relation between and adjacent the side margins of said back and face plates, transverse slots in said side bearing plates, holes in said back and face plates registering with said slots, and bolts engaging through said holes and slots to adjustably clamp said side bearing plates between said back and face plates; together with a spindle-supporting leaf mounted for reciprocation within said guide frame and resilient means engaging between said frame and leaf.

2. In a wheel mounting, a guide frame assembly comprising a back plate adapted for vertical disposition in fixed relation with a vehicle frame, a face plate spaced outwardly from and in overlying relation with said back plate, side bearing plates disposed in spaced, parallel relation between and adjacent side margins of said back and face plates, means engaging through lateral slots in said side bearing plates and with said back and face plates to adjustably clamp the former between the latter, a cap block laterally of and between upper margins of said back and face plates, a leaf mounted for reciprocation within said guide frame between said side bearing plates and beneath said cap block, a stem fixed to and rising from the upper central portion of said leaf, a hole in said cap block disposed to slidably receive said stem, resilient means operatively between said leaf and cap block, a spindle supported by and in perpendicular relation with said leaf, and slots in said back and face plates to accommodate vertical travel of said spindle.

3. In a wheel mounting, the combination with a resiliently-mounted, spindled leaf of a fixed guide frame forming a slide bearing for said leaf, said frame comprising a vertically-disposed back plate adapted to be fixed to a vehicle frame, a coextensive face plate overlying said back plate in outwardly-spaced relation therewith, side bearing plates vertically disposed in spaced, parallel relation between and adjacent opposite side margins of said back and face plates for bearing engagement of their inner margins with side margins of said leaf, means engaging through transverse slots in said side bearing plates to adjustably clamp the latter between said back and face plates, whereby the transverse spacing between said side bearing plates may be varied to maintain suitable bearing engagement with the leaf margins, a cap block transversely of and between upper margins of said back and face plates, an enlarged central portion on said cap block, a guide hole through said enlarged cap block portion, a stem fixed to said leaf and slidably engaging through said guide hole, resilient means operatively between said leaf and cap block, and slots in said back and face plates disposed to accommodate vertical travel of the spindle element carried by said leaf.

JOHN E. ROLLO.